United States Patent
Van Rens et al.

(10) Patent No.: US 10,671,820 B2
(45) Date of Patent: Jun. 2, 2020

(54) WEARABLE SPORTS TIMING TAG ASSEMBLY

(71) Applicant: Mylaps B.V., Haarlem (NL)

(72) Inventors: Bas Jan Emile Van Rens, Heemstede (NL); Jeroen Johan Willemse, Haarlem (NL); Adriaan Klaas Verwoerd, Hoofddorp (NL)

(73) Assignee: MYLAPS B.V., Haarlem (NL)

( * ) Notice: Subject to any disclaimer, the term of this patent is extended or adjusted under 35 U.S.C. 154(b) by 0 days.

(21) Appl. No.: 15/028,898

(22) PCT Filed: Oct. 13, 2013

(86) PCT No.: PCT/EP2013/003076
§ 371 (c)(1),
(2) Date: Apr. 12, 2016

(87) PCT Pub. No.: WO2015/051813
PCT Pub. Date: Apr. 16, 2015

(65) Prior Publication Data
US 2016/0259952 A1    Sep. 8, 2016

(51) Int. Cl.
*G06K 7/10* (2006.01)
*G06K 19/077* (2006.01)
*G07C 1/24* (2006.01)

(52) U.S. Cl.
CPC ... *G06K 7/10366* (2013.01); *G06K 19/07766* (2013.01); *G07C 1/24* (2013.01)

(58) Field of Classification Search
CPC . G06K 19/0716; G06K 19/07749; G07C 1/24
See application file for complete search history.

(56) References Cited

U.S. PATENT DOCUMENTS 5,604,485 A * 2/1997 Lauro ............... G06K 19/0672
340/10.42
8,179,233 B2  5/2012 Kia
(Continued)

FOREIGN PATENT DOCUMENTS

CN     1384955 A   12/2002
CN     1672060 A    9/2005
(Continued)

OTHER PUBLICATIONS

International Search Report and Written Opinion for International Application No. PCT/EP2013/003076, dated Apr. 14, 2014, 11 pages.
(Continued)

*Primary Examiner* — James S. McClellan
*Assistant Examiner* — Kevin M Carter
(74) *Attorney, Agent, or Firm* — Steven M. Koehler; Westman, Champlin & Koehler, P.A.

(57) ABSTRACT

A wearable sport timing tag assembly comprising at least a first and second tag is described for transmitting data associated with the wearer of the tag assembly to at least one detection antenna, wherein the tag assembly comprises means for attaching the tag assembly to at least a body part or clothing of the wearer, wherein when attached to said body or clothing the main signal transmission direction of said first tag being in a first direction; and, the main signal transmission direction of said second tag being in a second direction which is different from said first direction.

16 Claims, 8 Drawing Sheets

(56) References Cited

U.S. PATENT DOCUMENTS

| | | | |
|---|---|---|---|
| 8,659,477 B2 | 2/2014 | Fukagawa | |
| 9,563,835 B2* | 2/2017 | Karani | G06K 19/07758 |
| 2005/0108912 A1* | 5/2005 | Bekker | G09F 3/005 |
| | | | 40/633 |
| 2006/0220859 A1 | 10/2006 | Nagai et al. | |
| 2007/0017136 A1* | 1/2007 | Mosher, Jr. | A61B 5/117 |
| | | | 40/633 |
| 2009/0184806 A1* | 7/2009 | Kia | G04F 8/08 |
| | | | 340/10.52 |
| 2010/0109844 A1 | 5/2010 | Carrick et al. | |
| 2010/0123586 A1 | 5/2010 | Baba et al. | |
| 2010/0154484 A1 | 6/2010 | Skoric et al. | |
| 2011/0140970 A1 | 6/2011 | Fukagawa et al. | |
| 2011/0233281 A1* | 9/2011 | Howell | G06K 19/02 |
| | | | 235/488 |
| 2011/0234383 A1* | 9/2011 | Hansen | G06K 19/07749 |
| | | | 340/10.4 |
| 2011/0266343 A1* | 11/2011 | Liu | G06K 19/07762 |
| | | | 235/435 |
| 2012/0056719 A1* | 3/2012 | Krishna | G06K 19/07762 |
| | | | 340/10.1 |
| 2015/0028898 A1 | 1/2015 | Hanssen et al. | |

FOREIGN PATENT DOCUMENTS

| | | |
|---|---|---|
| CN | 1786977 A | 6/2006 |
| CN | 103336932 A | 10/2013 |
| EP | 2 009 595 A1 | 12/2008 |
| EP | 3055811 A1 | 8/2016 |
| WO | 2010041463 | 4/2010 |
| WO | 2009004728 A1 | 8/2010 |
| WO | 2013068043 | 5/2013 |

OTHER PUBLICATIONS

Office Action for Japanese Patent Application No. 2016-547220, dated May 26, 2017.
Chinese Office Action dated Feb. 24, 2018 for corresponding Chinese Application No. 201380081113.2, filed Oct. 13, 2013.
Japanese Office Action, dated Feb. 15, 2019 for corresponding Japanese Patent Application No. 2018031792, filed Mar. 1, 2018.
Chinese Office Action for Chinese Patent Application No. 201380081113.2, dated May 5, 2019.
New Zealand Examination Report, dated Aug. 23, 2019, for corresponding IP No. 718767.
Japanese Office Action, dated Aug. 26, 2019, for corresponding Japanese Patent Application No. 2018-031792, filed Mar. 1, 2018.
Examination Report from Australian Patent Office for Australian Patent Application No. 2013402720 dated Mar. 2, 2019.

* cited by examiner

WEARABLE SPORTS TIMING TAG ASSEMBLY

CROSS-REFERENCE TO RELATED APPLICATION

The present application is a national stage filing of International patent application Serial No. PCT/EP2013/003076, filed Oct. 13, 2013, and published as WO 2015/051813 A1 on Apr. 16, 2015, in English.

FIELD OF THE INVENTION

The present invention relates to sports timing and in particular to wearable sports timing tags, wearable bands comprising a sports timing tag, a method in an RFID reader of obtaining data from a sports timing tag, and a method of programming sports timing tags.

BACKGROUND

The discussion below is merely provided for general background information and is not intended to be used as an aid in determining the scope of the claimed subject matter.

Radio-frequency identification (RFID) is a wireless technique, which uses radio-frequency electromagnetic (EM) fields to transfer data for the purposes of automatically identifying and tracking tags attached to objects. A battery-less tag, usually referred to as passive tag, has no power source of its own but collects energy from an interrogating EM field originating from a detection antenna of an RFID reader. The tag acts as a passive transponder emitting microwaves or ultra-high frequency (UHF) signals to the detection antenna. Passive tags are relatively inexpensive to manufacture and can be used as disposable tags.

One problem relates to the fact that, when used in sports timing applications, the UHF tag is within close proximity of the body, which has a dielectric of relatively high dielectric constant. The proximity of the body changes the impedance of the tag antenna thereby "detuning" the tag away from its optimum working point. Due to this detuning effect, the modulated backscatter signal that is generated by the tag will be very small and thus very hard to detect. The detuning is even worse in a wet environment, e.g. wet and sweaty clothing and/or body of an athlete. This way, the signal may further deteriorate thereby increasing the risk that a participant crossing or passing a detection antenna is not or at least not correctly registered by the timing system.

Another problem relates to movement of an UHF sports timing tag relative to the detection antenna when an athlete passes the finish. Due to the movement and/or rotation during the finish crossing, it is possible that the tag is in a non-optimal orientation towards the detection antenna. This may result in a miscommunication between the tag and the reader resulting in an unreliable timing or registration of the participant when crossing the detection antenna.

An example of a sporting event where both problems are particularly present is a triathlon event. Triathlon, in its most popular form, involves swimming, cycling, and running in immediate succession over various distances. Triathletes compete for fastest overall course completion time, including timed "transitions" between the individual swim, cycle, and run components. Triathletes may wear a sport timing tag somewhere on the body, e.g. on the chest, around the ankle or around the wrist, for accurate time registrations at detection points.

To be able to read the small backscattered signal generated by a sports timing tag, the detection antenna may be optimized for reading weak signals. For example, EP2009595 A1 discloses a solution for increasing the detectability of sport timing tags using antenna mats that are arranged in parallel with the finish line. EP2009595 A1 suggests reducing the number of misses (i.e. tags that cross the finish but are not detected by the antenna) by optimizing the radiation field of the antenna mats so that a homogenous interrogating and detection electromagnetic (EM) field over the whole finish line is generated. This solution however does not solve the problem of misses due to misorientation between the tag and the detection mat. Even when generating a homogenous EM field, the backscatter signal may be very weak due to the misorientation. Furthermore, implementation of the improved antenna mats in an existing timing system would require replacement of the mats, thereby rendering the non-optimized (legacy) detection antennas obsolete, which is not desirable in terms of costs and environmental issues.

Consequently, from the above it follows that there is a need in the art for cost efficient solutions to the above-identified problems associated with sports timing tags. In particular, there is a need in the art for a sports timing tag assembly that can be reliably used during sports events, including triathlon or similar events, on the basis of a legacy detection antenna.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In a first aspect the invention may relate to a wearable sport timing tag assembly comprising at least a first and second tag, preferably UHF tags, more preferably UHF tags comprising a monopole, dipole or quadrupole antenna, for transmitting data associated with the wearer of the tag assembly to at least one detection antenna, wherein the tag assembly comprises means for attaching the tag assembly to at least a body part or clothing of the wearer, wherein when attached to said body or clothing the main signal transmission direction of said first tag being in a first direction; and, the main signal transmission direction of said second tag being in a second direction which is different from said first direction.

Hence, when using a conventional sports timing tag, the direction sensitivity of a tag in combination with the very small backscattered signal and the strong detuning due to the presence of the body of the participant increases the risk that participants that pass or cross the RFID reader are not detected by the detection antenna. The sports timing tag assembly elevates this problem by positioning multiple UHF tags on a flexible substrate of a predetermined spacer thickness, e.g. a wearable or attachable band, such that—when worn by the athlete—the main transmission direction of the backscattered signals is different for at least part of the different tags. The sports timing tag assembly ensures detection of participants in particular difficult circumstances wherein the chance that a pass is missed is high e.g. during the start of a marathon or during more complex sporting events such as a triathlon or the like.

During the passing or crossing of the RFID reader, at least one of the tags of the tag assembly is orientated towards the RF field of the RFID reader such that amplitude of the backscattered signal is sufficiently large for detection by the RFID reader, regardless the orientation of the athlete with respect to the RFID detector and/or movements of the athlete. Furthermore, the sports time assembly allows substantial reduction of the number of misses without the need of modifying or replacing the RFID readers.

In an embodiment, said first and second tag are disposed on a flexible support substrate, preferably elongated flexible support substrate. In an embodiment, said at least first and second tag are evenly distributed of the longitudinal direction of said support substrate. In an embodiment, the longitudinal axis of said first and second tags are parallel to the longitudinal axis of said support substrate. In an embodiment the longitudinal axis of said first tag makes an angle with the longitudinal axis of said second tag. In an embodiment said first and second tags are positioned in a row in the longitudinal direction of said support substrate.

Multiple tags may be positioned on the carrier substrate such that interference and/or coupling effects between the tags is minimized.

In an embodiment the thickness of said support substrate has a thickness selected between 2 mm and 15 mm, preferably between 4 and 8 mm. In an embodiment said flexible support substrate comprises a low-dielectric (dielectric constant between 1 and 10) flexible material, preferably an elastomeric polymer, more preferably a neoprene or EPDM foam material or an equivalent thereof. Hence, substrate effectively functions as a spacer for keeping the antennas away from the body of the athlete thereby avoiding or at least minimizing detuning due the high electric of the body (dielectric constant of water is around 80.4 at 20 degrees Celsius).

In an embodiment the at least first and second tag each comprise a memory for storing an identifier associated with the wearer, wherein the identifier stored in said first tag is identical to the identifier in said second tag.

In an embodiment the at least first and second tag each comprise a memory for storing an identifier associated with the wearer, wherein the identifier stored in said first tag is identical to the identifier in said second tag.

In an embodiment said sports timing tag assembly is configured as a band that is worn around at least part of a body part, preferably said sports timing tag assembly being configured as a wrist band or an ankle bank.

In an embodiment said band comprises flexible spacer layer, a flexible support substrate affixed to said spacer layer for supporting said tags and a top layer over said flexible support substrate for protecting said tags.

The sports timing tag assembly, wherein the top layer is made of a substantially untearable and/or water resistant material and/or is printable to include graphics and/or text.

In an embodiment material of said spacer layer is a low-dielectric flexible material, preferably an elastomeric polymer, more preferably a neoprene or EPDM foam material or an equivalent thereof.

In an embodiment at least on end of the top layer or spacer layer comprises extension part for fixating the extending part to the other end of the band when the band is fit around at least part of the body part.

In an embodiment the extending part comprises an adhesive for fixating the extending part to the top layer at the other end of the wearable band when the wearable band is fit around at least part of the body part.

According to an aspect of the invention a method in an RFID reader is proposed of obtaining data from a sports timing tag assembly as described above or from a wearable band comprising a sports timing tag assembly as described above. The method can comprising transmitting a signal from a RFID reader's detection antenna to at least one of at least a first and second tag of the sports timing tag assembly. The signal can powers and activate said tags to transmit the data to the detection antenna. The method can further comprise receiving the data from said tags in the RFID reader. The method can further comprise storing said data in a storage that is communicatively connected to the RFID reader.

Thus it is possible to use sports timing tag assembly or wearable band for sports timing.

An embodiment advantageously enables tags programmed with different data to be used in a sports timing tag assembly.

According to an aspect of the invention a method is proposed of programming at least a first and second tag in a sports timing tag assembly as described above or in a wearable band as described above. The method can comprise transmitting a signal comprising a first command from a programming device to the sports timing tag assembly for obtaining a tag identifier from each tag of the tag assembly. The method can further comprise receiving the tag identifier in the programming device from each tag. The method can further comprise transmitting a second command from the programming device to each tag using the received tag identifiers to address the tags. The second command can comprise data to be written in a programmable memory of each tag. The method can further comprise verifying the data stored in the programmable memory of each tag by sending a signal to the wearable band to power and activate each tag and to obtain the data from the programmable memory of each tag, and comparing the obtained data of each tag with the data transmitted to the tags for programming the tags.

Thus, an efficient way of programming the tags in the wearable band is provided, wherein the tags can be programmed in one programming operation and the result of the programming can be verified.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to the drawings, in which.

DETAILED DESCRIPTION OF THE ILLUSTRATIVE EMBODIMENTS

Figure 1A:
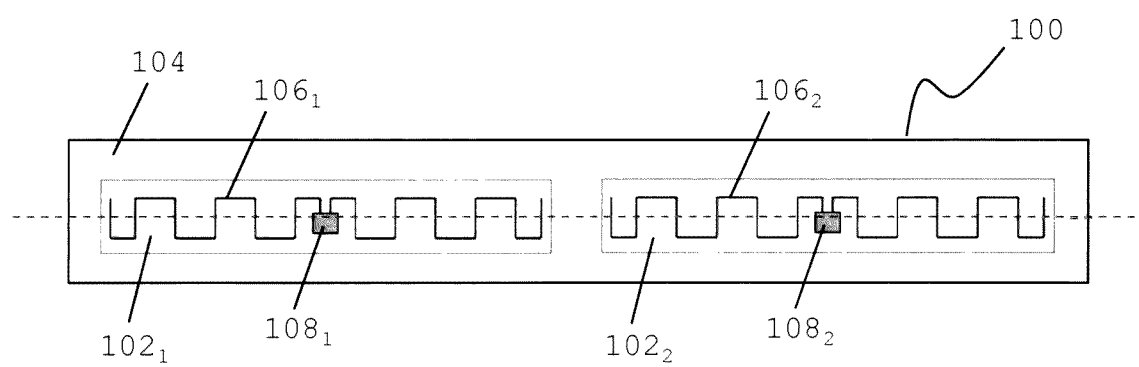
FIGS. 1A and 1B depict a sport timing tag assembly according to an embodiment of the invention.
Figure 1B:
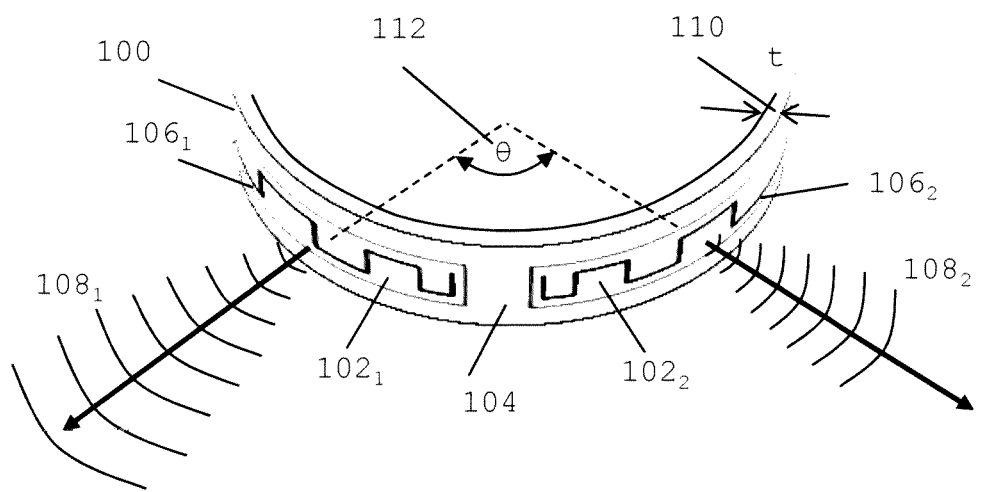

FIG. 1A and FIG. 1B show an exemplary embodiment of a sports timing tag assembly according to an embodiment of the invention. In FIG. 1A a top view of the sports timing tag assembly 100 is shown before wearing, i.e. in a substantially flat orientation. The tag assembly may comprise multiple, i.e. at least two, RFID tags $102_{1,2}$ positioned on a flexible support substrate 104 of a predetermined width and length. A tag may comprise an antenna $106_{1,2}$ (e.g. a dipole antenna) and a microprocessor $108_{1,2}$, e.g. an application specific integrated circuit (ASIC) chip. Typically UHF tags have an elongated form due to the fact that length of the antenna is about half the wavelength that needs to be detected. In this particular example, tags are positioned adjacently so that the their longitudinal axis substantially line up and are parallel to the longitudinal axis of the flexible substrate. In this configuration there is no or minimal electromagnetic coupling between the tags. It is submitted the configuration depicted in FIG. 1A is a non-limiting example. Many variations are possible and are described hereunder in more detail. In an embodiment, the tags may be (passive) UHF RFID tags. The tags may be any suitable commercially available tag.

FIG. 1B depicts the timing tag assembly of FIG. 1A in a three-dimensional view when worn around at least part of a body part, such as an ankle or wrist of the athlete. As shown in FIG. 1B, the substrate may have a thickness t. In an embodiment, the thickness of the substrate may be selected within a range between 2 mm and 15 mm, preferably between 4 and 8 mm. In another embodiment, the spacer material may be a low-dielectric flexible material, preferably an elastomeric polymer for example a foam rubber such as a neoprene or EPDM foam material or an equivalent thereof. Here a low-dielectric flexible material may be interpreted as any flexible material that has an dielectric constant that is substantially lower than the dielectric constant of the body (mainly water that has a dielectric constant of about 80). Hence, preferably the low dielectric material has a dielectric between 1 and 10. For example, EPDM foam has a dielectric constant between 2.6 and 2.8 and neoprene has a dielectric constant of about 6.7.

This way, the substrate effectively functions as a spacer for keeping the antennas away from the body of the athlete thereby avoiding or at least minimizing detuning due the high electric of the body (dielectric constant of water is around 80.4 at 20 degrees Celcius). Furthermore, as shown in FIG. 1B, the tags are positioned at the flexible substrate such that—when worn by an athlete—an angle Θ is present between the main signal transmission direction (i.e. the direction in which the transmission signal $108_{1,2}$ is maximal) of the tags. Depending on the design of the tag assembly different angles Θ may be selected. In an embodiment, 8 may be selected between 10 and 180 degrees.

As will be described hereunder in more detail, when using a planar dipole antenna, the transmission direction of the RF signal is perpendicular to the antenna surface and is maximum at the location where the two antenna parts of the dipole are connected to the microprocessor chip. By positioning multiple tags on the spacer substrate, the tag assembly will transmit—when worn by the athlete or participant—in different directions thus increasing the chance that at least one of the tags radiates in a direction that is optimal or sufficiently large with respect to the detection antenna so that the chance that the small signal transmitted by the tag is not detected by the RFID system is minimized. For example in FIG. 1B, the RF signal of the RFID reader (not shown) activates both tags $106_1, 106_2$. However, due to the fact that the orientation of the first tag $106_1$ with respect to the reader is better than the orientation of the second tag $106_2$, the backscatter signal of the first signal will be stronger than the second backscatter signal, which may be to weak to be detected by the RFID reader. A further advantage of the tag assembly is that it may be used together with existing RFID readers. Hence, the sports time assembly allows substantial reduction of the number of misses without the need of modifying or replacing the RFID readers.

Figure 2A:
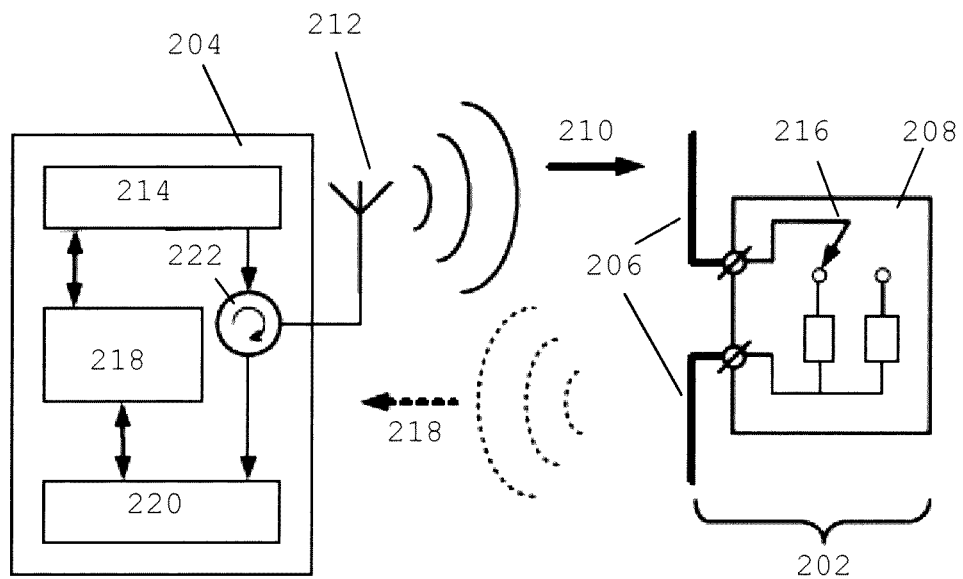
FIGS. 2A and 2B illustrates the operation of an RFID system for use with a sport timing tag assembly of an embodiment of the invention.

FIG. 2A schematically illustrates the operation of a RFID system comprising an RFID reader 204 and RFID tags 202 of a tag assembly according to FIGS. 1A and 1B. The tags comprise an antenna 206 (e.g. a dipole antenna) and a microprocessor 208. The microprocessor may receive power from the RF signal 210 transmitted by the RFID reader via its antenna 212. The RF signal may be generated using a baseband processor 214 and a transmitter module 218 in the RFID reader.

The tag may use frequencies selected in the UHF band between approximately 860 and 960 MHz. UHF RFID systems operate between 902 and 928 MHz in North America, at 868 MHz in Europe and at 920 MHz in Asia (Japan). UHF tags are relatively cheap (so that they can be used as a one-time use disposable tag), are relatively light weighted, and may be read faster over larger distances when compared with lower frequency tags such as high frequency (HF) tags.

The tag may be configured (e.g. programmed) to transmit data, e.g. a (unique) value for identifying the athlete wearing the tag assembly, back to the RFID reader. The data may be transmitted by switching the input impedance of the tag between two states using switch 216 thereby modulating the backscattered signal 218. At each impedance state, the RFID tag presents a certain radar cross-section. One of the impedance states is usually high and another is low to provide a significant difference in the backscattered signal. The modulated backscattered signal 218 may be processed in a receiver module 220 of the RFID reader. A circulator 222 may switch the RFID reader between a transmitting mode and a receiving (detection) mode.

Figure 2B:
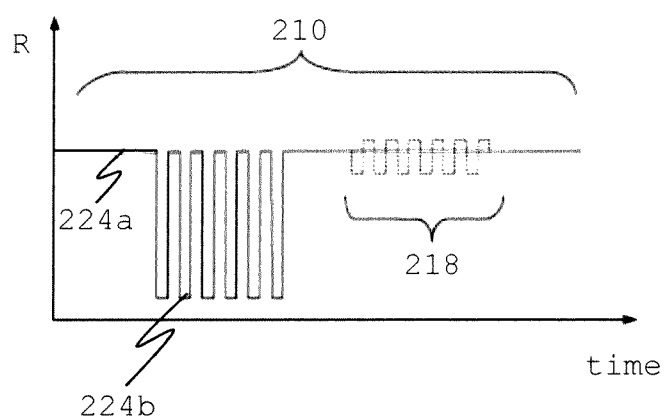

FIG. 2B depicts a graph representing signal strength R received by the RFID reader as a function of time t. Data exchange between RFID reader 204 and tag 202 may employ various modulation and coding schemes (e.g. amplitude modulation and Manchester coding). The RF signal 210 transmitted on the forward link may contain both continuous wave (CW) 224a and modulated commands 224b, as shown in FIG. 2. On the reverse link the data may be sent back during a CW period when the tag impedance modulates the backscattered signal. As shown in FIG. 2B, the strength of the modulated backscattered signal 218 is very small compared to the carrier signal CW 224a,224b.

Figure 3:
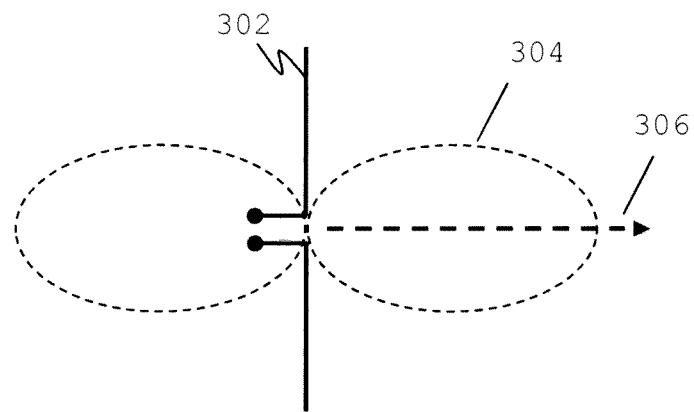
FIG. 3 depicts a cross-section view of an electromagnetic field of a RFID dipole antenna.

The signal radiation pattern of monopole or dipole based RFID tag is omnidirectional. For example, a dipole antenna of an RFID tag may produce an electromagnetic field 304 that is substantially toroidal-shaped centered about the antenna axis 302, as illustrated in the cross-section view of FIG. 3. The electromagnetic field and thus the signal strength of the backscattered signal 304 is maximum at right angles to the dipole antenna, dropping off to zero on the antenna's axis. Hence, the signal radiation pattern of the modulated backscattered signal is typically maximal in the direction perpendicular to the plane of the tag antenna (i.e. in the direction normal to the plane of the tag antenna). This direction may be referred to as the main signal transmission direction. Therefore, for optimal detection the plane of the tag antenna preferably should face the detection antenna of the RFID reader (or the normal of the antenna plane is pointing towards the RFID reader).

Hence, when using a conventional sports timing tag, the direction sensitivity of a tag in combination with the very small backscattered signal and the strong detuning due to the presence of the body of the participant increases the risk that participants that pass or cross the RFID reader are not detected by the detection antenna. The sports timing tag assembly elevates this problem by positioning multiple UHF tags on a flexible substrate of a predetermined spacer thickness, e.g. a wearable or attachable band, such that—when worn by the athlete—the main transmission direction of the backscattered signals is different for at least part of the different tags. The sports timing tag assembly ensures detection of participants in particular difficult circumstances wherein the chance that a pass is missed is high e.g. during the start of a marathon or during more complex sporting events such as a triathlon or the like.

Figure 4:
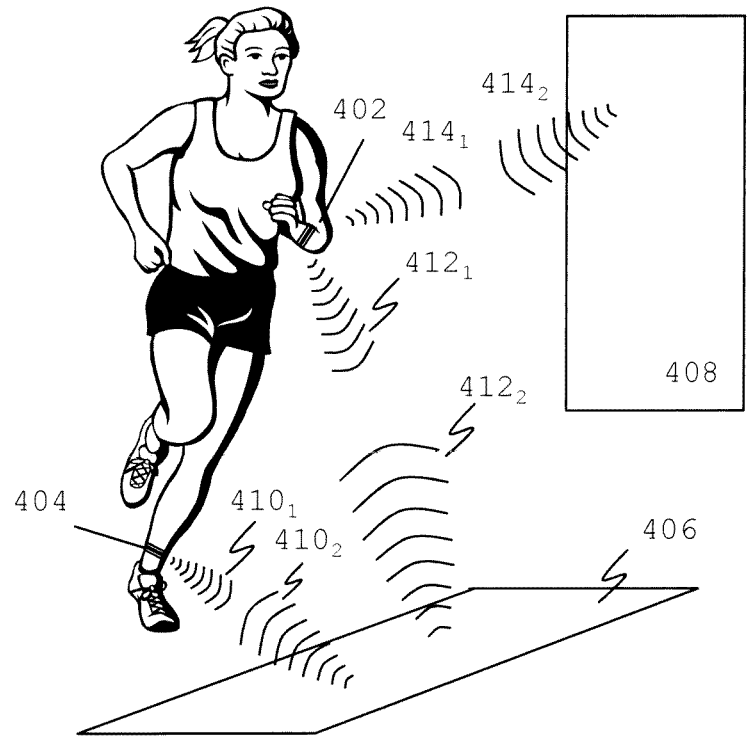
FIG. 4 depicts the detection of an athlete wearing a tag assembly according to an embodiment of the invention.

FIG. 4 depicts the detection of an athlete wearing a sports timing tag assembly according to embodiment of the invention. The sports timing tag assembly may be implemented in different ways, e.g. in the form of a wearable wristband 402 or ankle strap 410. Alternatively, the sports timing tag assembly may be attached to e.g. clothing, a body part, the race bib, shoe, (sports) equipment such as a bicycle, boat or a wheel chair. The tag assembly may be part of a band, belt, strap, sticker, clothing or the like. During the passing or crossing of the RFID reader, e.g. an antenna mat 406, a vertical side antenna 408, or an overhead antenna (not shown) at least one of the tags of the tag assembly is orientated towards the RF field 410$_1$, 412$_1$, 414$_1$ of the RFID reader such that amplitude of the backscattered signal 410$_2$, 412$_2$, 414$_2$ is sufficiently large for detection by the RFID reader, regardless the orientation of the athlete with respect to the RFID detector and/or movements of the athlete.

Preferably the RFID tags in the tag assembly may be a (passive) UHF tag comprising a half-wave dipole antenna or quarter-wave monopole antenna. An example of commercially available tag that is suitable for use in the tag assembly includes the UPM™ or SMARTRAC™ Raflatac Dog-Bone™ m UHF dipole tag. This tag has an antenna size of 93×23 mm, a die-cut size of 97×27 mm and a total length of 100 mm thereby determining the minimum dimensions (e.g width) of the tag assembly.

In response to the RF signal of the RFID reader (the modulated trigger signal), one or more tags of the sports timing tag assembly may transmit information stored in the memory of the tag's chip back to the detection antenna on the basis of a modulated backscattered signal, i.e. the tag signal. This way, the tag assembly may start sending out messages including e.g. a unique ID identifying the tag(s) and/or any other data programmed in a memory of the tag chip. The detection antenna may pick up the transmitted messages, timestamp the messages and transfer them to a processor. The processor may execute an algorithm for determining a time associated with the tag on the basis of time of detection and the signal strength of the received messages. The processed data may be subsequently stored in a storage medium, e.g. a database, for further use. For each read operation the exchanged information and a time stamp may be recorded. These records may be used to calculate an event completion time for each participant. The completion times are subsequently used to rank the participants.

Figure 5:
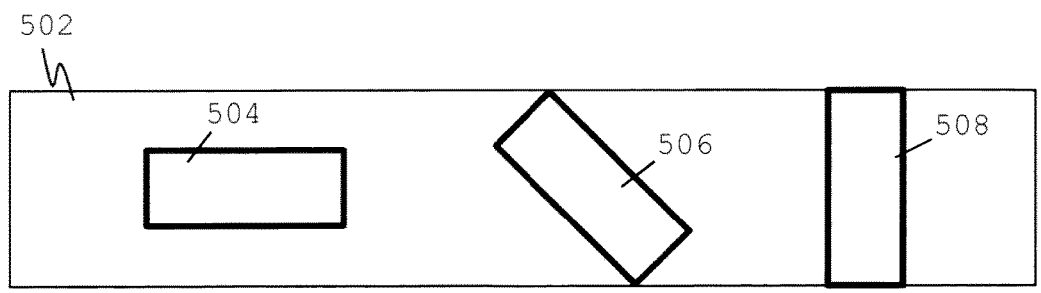
FIG. 5 depicts a sport timing tag assembly according to embodiment of the invention.

Adding more tags to the sports timing tag assembly may increase the chance of having at least one of the tags in a readable position to the tag reader. Also the orientation of each individual tag in the tag assembly may be varied to further optimize readability chances. For example, in an embodiment, the tags may be positioned on the support substrate, wherein the longitudinal axis of a first makes an angle with the longitudinal axis of a second tag. For example, FIG. 5 depicts a top view of a schematic of a sports timing tag assembly 502 according to an embodiment of the invention. The tag assembly may comprise three tags 504, 506, 508 in different orientations wherein the angle between longitudinal axis of the tag and the substrate is zero degrees 504, 45 degrees 506, and 90 degrees 508. The orientations of the tags in FIG. 5 are to be understood as exemplary; tags may be positioned at any angle on the substrate and the number of tags may vary.

Figure 6A:
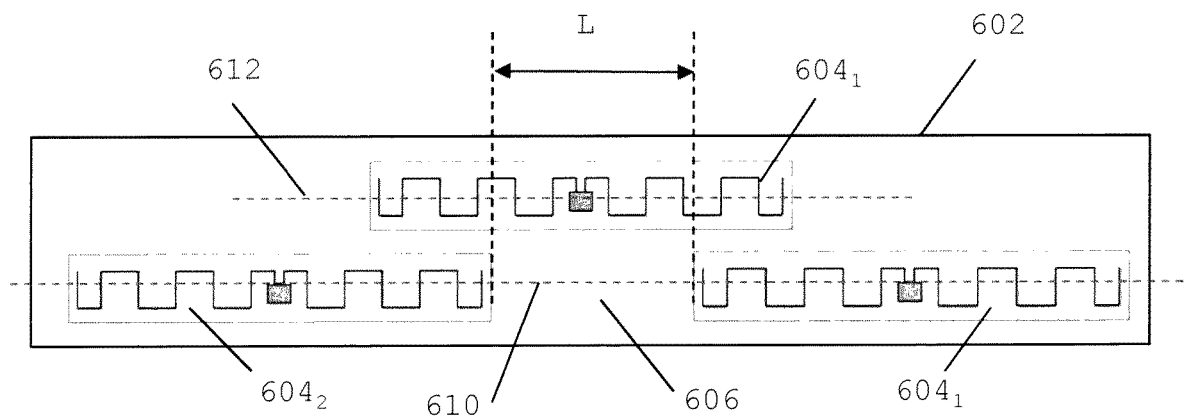
FIGS. 6A and 6B depict a sport timing tag assembly according to another embodiment of the invention.
Figure 6B:
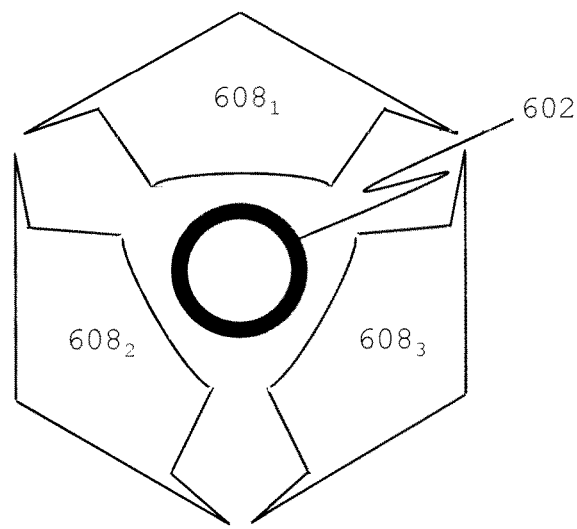

FIGS. 6A and 6B depict a sport timing tag assembly according to another embodiment of the invention. In this configuration the sports timing tag assembly 602 may comprise three or more tags 604$_{1-3}$ having their longitudinal axis in substantially parallel orientation to the longitudinal axis of the support substrate. In one embodiment a first and second tag may be positioned on a first longitudinal axis 610 wherein a gap 606 of length L defines the distance between the first and second tag. At least a third tag may be positioned on a second longitudinal axis 612 parallel to said first longitudinal axis at the height of the gap. This way, the third tag is positioned relative to said first and second tag such that the radiation field of the third tag is maximum at the location of said gap. Hence, in this way interference and/or coupling effects between the tags is minimized. This way multiple tags may be positioned on the carrier substrate without the risk that the tags are detuned during operation. The distribution scheme as depicted in FIG. 6A may be easily extended to multiple rows of tags.

FIG. 6B depicts a schematic of the sport timing tag assembly when worn around the ankle or wrist of an athlete. When in use, the sports timing tag assembly 602 is curved to fit around at least part of a body part or clothing of the athlete. As a result the different tags in the tag assembly face different directions. The presence of multiple tags facing different directions substantially deceases the risk that the athlete is not detected.

Similar to the example of FIG. 1B—when curved—each (dipole) tag antenna generates a substantially toroidal shaped electromagnetic field centered about the antenna axis. The arrows 608$_{1-3}$ depict the directions of the possible backscatter signals. The orientation of the tag assembly with respect to the detection antenna determines which of one of the tags is triggered to generate a backscatter signal. In some cases, two tags may be triggered to generate a backscatter signal. In that case, the RFID may receive two backscatter signals originating from the same tag assembly. In that case, a known collision mechanism in the RFID reader may determine which signal from the tage assembly is processed (e.g. the signal with the highest signal strength).

Hence, when in use, the wearable sports timing tag assembly moves with the movement of the corresponding body part and/or rotates around the body part during use and during these movements and/or rotations at least one of the tags of the tag assembly is in appropriate orientation with the RFID reader so that a sufficiently strong backscatter signal is transmitted towards the reader.

Figure 7:
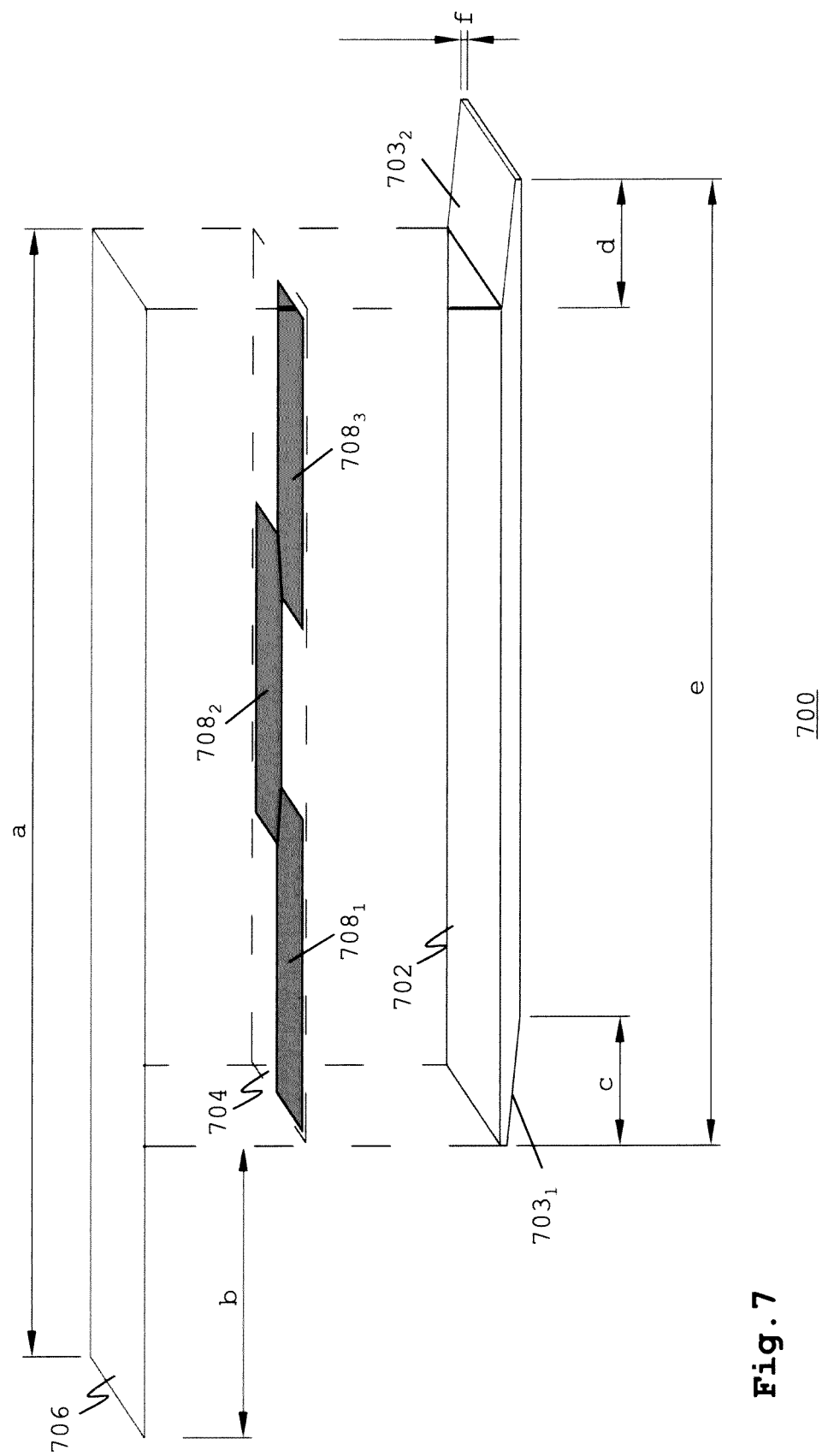
FIG. 7 depicts a sport timing tag assembly according to an embodiment of the invention.

FIG. 7 depicts a wearable sports timing tag assembly according to an embodiment of the invention. The sports timing tag assembly may be dimensioned for fitting around e.g. an ankle or wrist. More generally, the wearable band may be dimensioned for any appropriate use. As shown in FIG. 7, wearable sports timing tag assembly may have a multi-layered structure comprising (at least) a flexible longitudinal spacer layer 702, a flexible longitudinal thin substrate layer 704 comprising two or more tags $708_{1-3}$ and a longitudinal top layer 706. When laminated together, the layers may form a wearable tag assembly in the form of a wrist or ankle band in which the tags are embedded.

In this example, the tag assembly may comprise three tags $704_{1-3}$, positioned in a longitudinal direction on a thin flexible substrate 702 such as a thin plastic foil or a (non) woven sheet material. In an embodiment, the tags may be distributed on the thin substrate in accordance with the distribution as described with reference to FIGS. 6A and 6B. As a result,—when worn—at least one of the tags is likely to be able to communicate with the RFID reader in substantially any orientation of the ankle band with respect to the antenna of the reader.

When implemented as an ankle band the band may have a length in the range between 20 cm and 30 cm to fit around an adult ankle. A flat-surfaced UHF dipole antenna typically may have a length between 80 and 12 mm. The total length of one UHF tag, including the antenna and integrated circuit with processor and memory, may be around 100 mm in length. Hence, to optimally accommodate three or more tags in the tag assembly, the tags may be distributed over the band in accordance with the distribution scheme as described in detail with reference to FIGS. 6A and 6B.

The top layer 706 is the outermost layer that is visible when the ankle band is worn. Top layer 31 is preferably made of an untearable and/or water resistant material, such as Tyvex™. The top layer may also comprise graphics such as a logo and/or text such as the unique identification number of the participant (also referred to as "race number") and/or any other text.

The spacer 702 is the innermost layer closest to or in contact with the body or clothing of the athlete when the band is worn. The spacer is configured to create a spacing between the tag assembly and the body of the athlete. The spacer eliminates or at least decreases detuning of the tags due to the close presence of the body of the wearer of the sport timing tag assembly. The thickness t of the spacer may be selected between approximately 2 mm and 15 mm, depending on where the sports timing tag assembly is worn on the body/clothing and/or the humidity of the environment of the sports timing tag assembly. When part of an ankle band, the thickness of the spacer layer may be selected between 4 and 8 mm, preferably 6 mm. In an embodiment, the spacer layer may be configured to vary its thickness depending on the surrounding humidity. The spacer layer may be made of a soft but strong material with a low dielectric constant. For example, in an embodiment a foam material such as an EPDM rubber foam for comfortable wearing may be selected as spacer material.

The support substrate for supporting the tags is located between the spacer layer and the top layer. The substrate layer and tags may be flexible to enable bending of the tag assembly for wearing around a body part such as the ankle. The tags may include one or more monopole tags, one or more dipole tags or a combination thereof. The tags may be an UHF tags.

To improve wearing comfort, the width of a wearable band may be minimized to the combined width of the tags in the different rows of tags on the substrate. Moreover, the number of rows with tags may be minimized, while the total length of the tag assembly is covered with tags in longitudinal direction. If the wearable band is long enough, e.g. in case of a chest band, the tags may be positioned in a single row or a part thereof allowing the band to have a minimum width equal to the width of the tag.

The layers forming the wearable band may be selected to have different lengths. In the example of FIG. 7, the length of the support substrate for the tags may define the minimal diameter of the ankle band. The spacer layer may be selected longer (length "d") than the support substrate. An area $703_2$ with length "d" at the end of the spacer layer may be used for gradually reducing the thickness of the spacer to a thickness "f". A similar reduction in the thickness may be realized at an area $703_1$ of length "c" at other end of the spacer.

In an embodiment, the sloped areas $703_{1,2}$ of length "c" and "d" may be used to extend the length of band. In particular, the sloped areas at both ends of the spacer may be used to adjust the diameter of the ankle band by overlapping these sloped areas when attaching the band around the ankle. The area of overlap may depend on the diameter of the ankle.

In order to create a fixation area, the length of the top layer may be selected to be longer (length "b") than the support substrate for carrying the tags. When laminated together, the extended part of the top layer may be used to fixate the band around the ankle. Hereto, the extended part of the top layer may contain an adhesive for fixing the top layer to the other end of the top layer when put around the ankle. A protective layer may be present on the adhesive that is to be peeled off before use.

Figure 8A:
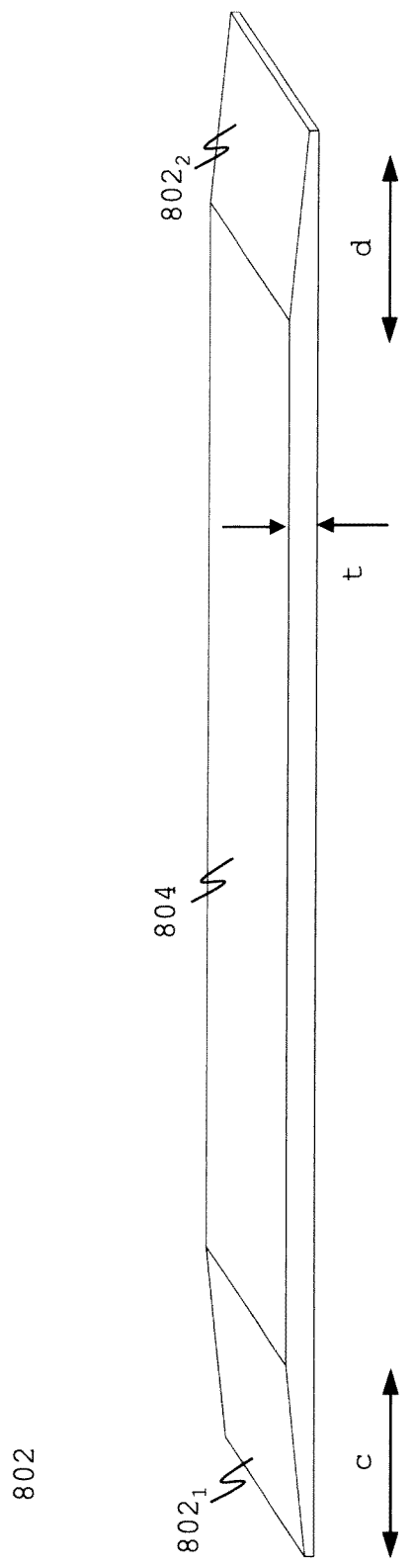
FIGS. 8A and 8B depict wearable bands for use in sport timing tag assembly according to an embodiment of the invention.

In FIG. 7 the sloped areas at both ends the spacer layer are substantially in the same direction. In another embodiment, the slopes of the sloped areas $802_{1,2}$ of the spacer layer 804 may be defined in opposite directions as shown in FIG. 8A (which only depicts the spacer layer).

Figure 8B:
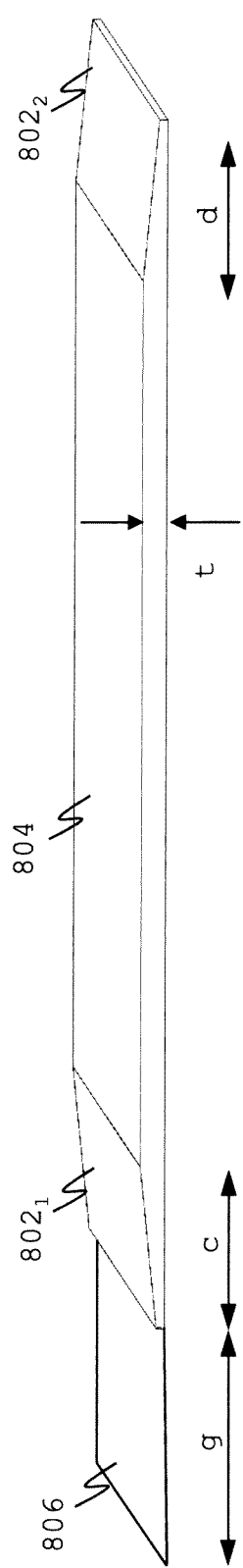

FIG. 8B shows the layer with the spacer of an alternative embodiment. In this example, the length of the spacer layer may be extended with an area 806 of length g at the second end of the ankle band. This extended area may be provided with an adhesive for fixating the band around the ankle.

It is submitted that instead of using an adhesive any other known fixation means may be used to fix the wearable tag assembly around a body part. For example Velcro™, a buckle and strap or a lace may be used instead. Furthermore, it is possible that both ends of the wearable band are joined together by e.g. an elastic band. Further, it is also submitted that further layers may be included for whatever reason (e.g. an woven layer that provides the band extra strength against ruptures. Furthermore, it is also possible that one or more tags are located in different layers inside the wearable band. A wearable sports timing tag assembly and/or a wearable band containing a sports timing tag assembly may be intended for one time use or may be reusable one or more times.

Figure 9:
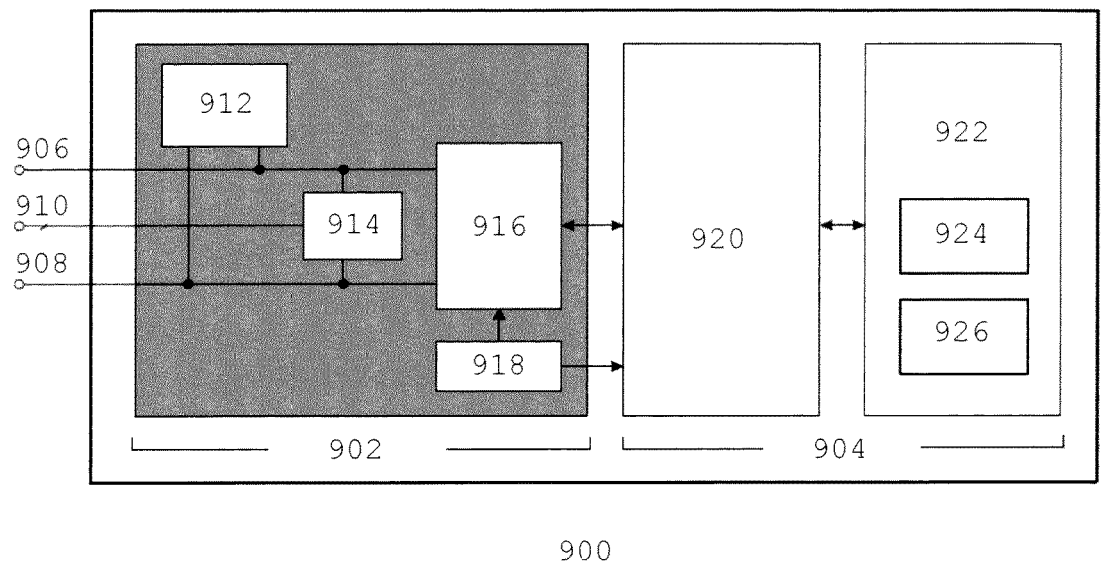
FIG. 9 depicts a schematic of a microprocessor for use in an RFID tag.

FIG. 9 depicts a schematic of the microprocessor of the UHF tag. The microprocessor may comprise an analog front-end part 902 and a digital control part 904. One or two antennas may be connected to the antenna ports 906 and 908. The microprocessor may further comprise a ground port 910. The tag may be activated by proximity of an RF signal of a reader. When the tag enters the RF field of the reader, a power management block 912 converts the induced electromagnetic field to the DC voltage that powers the chip. To divert electrostatic discharge (ESD) energy, an ESD protection block 914 shunts charge from positive and negative sources when a high voltage is present across the inputs, thus protecting the chip from damage.

A modulator/demodulator 916 demodulates the signal from the reader. Different known modulation formats may be used, such as DSB-ASK, SSB-ASK or PR-ASK. The tag may communicate to a reader via backscattering of the incident RF waveform by switching the reflection coefficient of its antenna(s) between reflective and absorptive states. Backscattered data is typically encoded as FM0 or Miller subcarrier modulation. The reader may instruct the microprocessor the type of encoding and the data rate, which is controlled by oscillator 918. A tag controller block 920 in the digital control part comprises a finite stat machine logic that carries out the command sequences.

A memory block 922 may be used to store information. In an embodiment, the memory block may comprise a programmable electronic product code (EPC) memory part 924 for storing up to 96 bits of data. In an embodiment, the EPC may be used to store a tag identifier that can be used to link the tag to an athlete wearing the tag assembly. In an embodiment, the EPCs of the tags in the tag assembly may comprise the same tag identifier. In another embodiment, the memory block may comprise a reserved memory part containing kill and access passwords for resetting the memory and access control for programming the memory. In yet another embodiment, the memory block may comprise a reserved memory part, e.g. a ROM, for storing a tag identifier (TID) 926. When activated the tag may transmit the EPC and/or TID in a modulated backscatter signal to the RFID reader.

The reader may be configured to associate the reception of the EPC and/or TID with a clock time (e.g. a timestamp) and link the EPC and/or TID to an athlete. Athletes in a sport event may be ranked based on the time they take to complete a course. Events that have a large number of participants often use RFID systems to identify participants. The RFID systems may also be used to track the participants at certain locations as they proceed through the race course. The tags in the sports time tag assembly may be used in combination with one or more RFID readers for automatic time and/or location registration of the participants. Typically, tags in a sports time tag assembly may be associated with the name and/or address of the participant (using the EPC and/or TID of the tags).

The tag reader typically does not differentiate between different tags in a single wearable sports timing tag assembly and tags in different wearable sports timing tag assemblies. Known RFID communication and collision protocols may be used to communicate with the tags, irrespectively of its location (i.e. within a single tag assembly or in different tag assemblies). Similar to known wearable bands with only one tag being read possibly multiple times when passing a detection antenna, one or more tags in a tag assembly may be read one or more times when passing the detection antenna.

Figure 10:
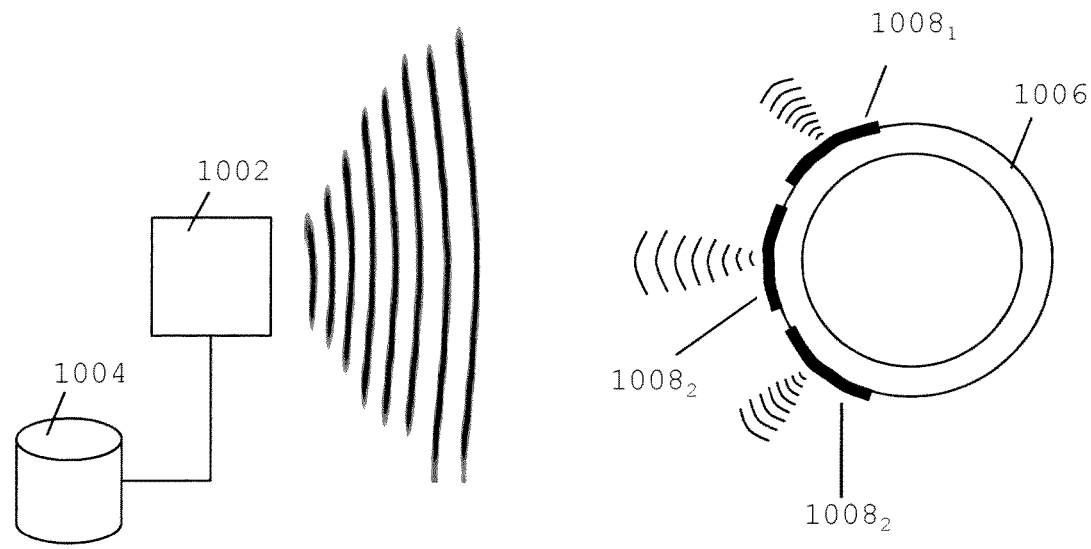
FIG. 10 illustrates an RFID system according to an embodiment of the invention.

FIG. 10 schematically illustrates the operation of an RFID system that may be used for programming the race number of the participant into the memory, e.g. the EPC memory part, of each tag of the sports timing tag assembly before the start of the sports event. The tag assembly 1006 and the RFID reader 1002 may be similar to the RFID reader as described with reference to FIGS. 1A and 1B. The race number is typically used to uniquely identify the participant or athlete during the sports event. All tags $1008_{1-3}$ in the wearable band may be programmed with the same unique race number, thereby allocating a single race number to the tag assembly. In this case it does not matter which tag or multiple tags of the tag assembly are read by the detection antenna during the race. The result of the read operation will be the race identifier in any of these cases.

Alternatively, one or more tags in the tag assembly may be programmed with different race numbers or different data, thereby allocating multiple race numbers or multiple data values to the tag assembly. In this case post processing may be required after reading a tag of the tag assembly to match the read race number or data to a single identity of e.g. a participant.

The tags in the tag assembly may be programmed in one or more programming operations. In case all tags are to be programmed with the same race number (or other data), the RFID reader may obtain the data that need to be written into the tags from a storage 1004. Next, a single programming message (including the data) may be (wirelessly) transmitted to all tags within range resulting in the data being programmed in the EPC memories of the multiple tags of the tag assembly.

In case the tags are to be programmed with different race numbers or different data, the RFID reader may obtain the data that need to be written in de memory of the tag from the storage. A command for obtaining the tag identifier from the ROM of the tags is (wirelessly) transmitted to all tags within range resulting in the tags backscattering their ROM identifier to the RFID reader. Next, programming messages (including the data and the tag identifier) may be (wirelessly) transmitted to the tags within range. This way the data are being programmed in the memories, preferably the EPCs of the tags of the tag assembly. After being programmed, the tags may be read once more to verify the programming of the memory. The storage 1004 or another storage that is communicatively connected to the RFID reader may be used for storing the data received from the sports timing tag assembly.

Figure 11:
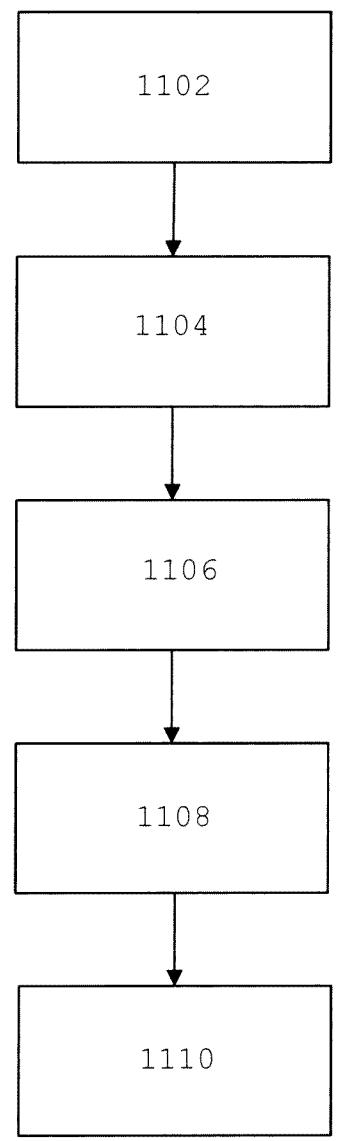
FIG. 11 depicts a flow chart of a process of programming tags in a sports timing tag according to an embodiment of the invention.

FIG. 11 represents a flow diagram of a programming operation by a programming device, such as the RFID reader, of tags in a sports timing tag assembly. In this example the tags receive the same data, e.g. the race number of the participant. In a first step 1102 the programming device may sends a signal comprising a command to the tags for reading e.g. the ROM-based tag identifier memory. The tags are powered and activated by the signal from the programming device and each tag may respond by transmitting their tag identifier to the programming device (step 1104).

Next, a signal comprising a programming command is transmitted to the tags (step 1106). The programming command may be defined such that only a targeted tag performs the command. Hereto the tag identifier may be included in the programming command, which is matched by the tag with its own tag identifier. When executing the programming command the memory, e.g. the EPC memory part, may be written with data that may be indicative of the race number (step 1108). Next, the programming operation may be verified in step 1110. The verification may comprise reading the sports timing tag assembly as if in use during a sporting event. The programming device may sends a signal to the tag assembly to power and activate the tags of the tag assembly and to read the data from the EPC memory. Together with the data from the EPC memory, the tag identifiers may be obtained. The programming device then verifies the received data of each tag, wherein the tags may be identified by the tag identifiers. Hereto the received data is compared with the data previously transmitted to the tags for programming the tags.

Instead of race numbers any other data may be programmed into tags. Typically the data that is programmed into the tags is related to the wearer of the sports timing tag assembly or the wearable band and used to identify the participant, either directly or after post processing the data received in the reader.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. A wearable sport timing tag assembly comprising:
an elongated flexible support substrate formed of a low-dielectric foam rubber having a first end and a second end, the flexible support substrate being configured as a band that can be worn around a wrist or an ankle of a user;
at least a first tag and a second tag disposed on the flexible support substrate, the first tag and the second tag being configured to transmit data associated with identifying a wearer of the tag assembly to at least one detection antenna, the flexible support substrate having a thickness between 4 and 15 mm that separates the first tag and the second tag away from a body of the user;
a water-resistant layer disposed over the first tag and the second tag, the water-resistant layer comprising graphics, the graphics including an identification of the wearer of the tag assembly; and
the flexible support substrate comprising at least one of an adhesive, a hook and loop fastener, a buckle and strap, and a lace fastener that is configured to attach the first end of the flexible support substrate to the second end of the flexible support substrate, wherein, when worn around a body part, a main signal transmission direction of the first tag is in a first direction and a main signal transmission direction of the second tag is in a second direction that is different from the first direction.

2. The tag assembly according to claim 1, wherein said first tag and said second tag are evenly distributed in a longitudinal direction of said flexible support substrate.

3. The tag assembly according to claim 1, wherein a longitudinal axis of said first tag and said second tag are parallel to a longitudinal axis of said flexible support substrate.

4. The tag assembly according to claim 1, wherein a longitudinal axis of said first tag makes an oblique or orthogonal angle with a longitudinal axis of said second tag.

5. The tag assembly according to claim 1, wherein said first tag and said second tag are positioned in a row in a longitudinal direction of said flexible support substrate.

6. The tag assembly according to claim 1, wherein the first tag and the second tag each comprise a memory configured to store an identifier associated with the wearer, wherein the identifier stored in said first tag is identical to the identifier in said second tag.

7. The tag assembly according to claim 1, wherein a first end of a top surface of the flexible support substrate or a spacer layer comprises an extension part that fixes to an extending part of a second end of the top surface or the spacer layer when the band is fit around at least part of the body part.

8. The tag assembly according to claim 7, wherein the extension part of the first end of the top surface or the spacer layer comprises an adhesive that fixes the extension part to the second end of the top surface or the spacer layer when the band is fit around at least part of the body part.

9. The tag assembly according to claim 1, wherein the low-dielectric foam rubber is a neoprene foam or a EDPM foam.

10. The tag assembly according to claim 1, wherein the first tag and the second tag are disposed over is a top surface of the flexible support substrate.

11. The tag assembly according to claim 1, wherein the band comprises at least one of an adhesive, a hook and loop fastener, a buckle and strap, and a lace fastener that is configured to attach a first end of the band to a second end of the band.

12. The tag assembly according to claim 1, wherein the flexible support substrate comprises at least one of an adhesive, a hook and loop fastener, a buckle and strap, and a lace fastener that is configured to attach the first end of the flexible support substrate to the second end of the flexible support substrate.

13. The tag assembly according to claim 1, wherein the water-resistant layer comprises graphics.

14. The tag assembly according to claim 13, wherein the graphics of the water-resistant layer comprise an identification of the wearer of the tag assembly.

15. The tag assembly according to claim 1, wherein the low-dielectric foam rubber is a neoprene foam or a EDPM foam.

16. The tag assembly according to claim 1, wherein a surface that the first tag and the second tag are disposed over is a top surface of the flexible support substrate.

\* \* \* \* \*